(12) United States Patent
Sobota et al.

(10) Patent No.: US 6,409,600 B1
(45) Date of Patent: Jun. 25, 2002

(54) GAME CONTROLLERS KEYS

(75) Inventors: John Sobota; Kip Hampson; Hee-Jong (Andy) Yu, all of Edmonton (CA)

(73) Assignee: Eleven Engineering Inc., Edmonton ( * ) Notice: Subject to any disclaimer, the term of this patent is extended or adjusted under 35 U.S.C. 154(b) by 0 days.

(21) Appl. No.: 09/311,393

(22) Filed: May 13, 1999

(51) Int. Cl.[7] ................................................. A63F 13/02
(52) U.S. Cl. ......................................................... 463/37
(58) Field of Search .................. 463/36–39; 273/148 B; 345/156, 157, 158, 159, 160, 161, 162, 163, 169; 200/5 A, 339, 341

(56) References Cited

U.S. PATENT DOCUMENTS

| | | | | |
|---|---|---|---|---|
| 4,687,200 A | * | 8/1987 | Shirai | 200/5 A |
| 4,748,441 A | * | 5/1988 | Brzezinski | 273/148 B |
| 4,952,919 A | * | 8/1990 | Nippoldt | 273/148 B |
| 5,011,149 A | * | 4/1991 | Purnell | 273/148 B |
| 5,034,574 A | * | 7/1991 | Martovitz | 273/148 B |
| 5,098,100 A | * | 3/1992 | Rand | 273/148 B |
| 5,160,918 A | * | 11/1992 | Saposnik et al. | 273/148 B |
| 5,237,311 A | * | 8/1993 | Mailey et al. | 273/148 B |
| 5,294,121 A | * | 3/1994 | Chiang | 273/148 B |
| 5,343,219 A | * | 8/1994 | DuBosque, Jr. | 273/148 B |
| 5,432,530 A | * | 7/1995 | Arita et al. | 273/148 B |
| 5,551,693 A | * | 9/1996 | Goto et al. | 463/37 |
| 5,598,090 A | * | 1/1997 | Baker et al. | 273/148 B |
| 5,607,157 A | * | 3/1997 | Nagashima | 463/37 |
| 5,624,117 A | * | 4/1997 | Ohkubo et al. | 273/148 B |
| 5,700,194 A | * | 12/1997 | Hsien | 463/37 |
| 5,734,376 A | * | 3/1998 | Hsien | 463/37 |
| 5,759,100 A | * | 6/1998 | Nakanishi | 460/37 |
| 5,820,462 A | * | 10/1998 | Yokoi et al. | 463/37 |
| 5,823,057 A | * | 10/1998 | Hsien | 273/148 B |
| 5,874,906 A | * | 2/1999 | Willner et al. | 345/161 |
| 5,984,785 A | * | 11/1999 | Takeda et al. | 463/38 |
| 6,102,802 A | * | 8/2000 | Armstrong | 463/37 |
| 6,135,886 A | * | 10/2000 | Armstrong | 463/37 |
| 6,153,843 A | * | 11/2000 | Date et al. | 463/37 |

* cited by examiner

*Primary Examiner*—Michael O'Neill
(74) *Attorney, Agent, or Firm*—Alan J. Atkinson

(57) ABSTRACT

An improved game controller. D-pad keys are positioned above a printed circuit board-with plungers guided by housing apertures. The D-pad key is top-loaded into contact with the housing to simplify manufacture and operating reliability. The D-pad key can be depressed downwardly until it contacts a pivot supported by a pivot post. The combination of elements permits significant design flexibility in the orientation and shape and operation of a D-pad key. Front mounted triggers replace front mounted buttons attached to a separate vertical printed circuit board. The triggers function with the main printed circuit board, thereby reducing cost and enhancing product reliability.

3 Claims, 1 Drawing Sheet

GAME CONTROLLERS KEYS

BACKGROUND OF THE INVENTION

The present invention relates to the field of keys used in electronic game controllers. More particularly, the invention relates to improved game controller keys having fast response and reliable action in response to a person's operating control.

Game controllers provide the link between a gamer and a video game. Game controller keys depress internal elastomeric switches which close an electrical connection on a printed circuit board. By closing preprogrammed switches, a gamer's acts are transferred to a video game console which reacts with a preprogrammed on-screen game event.

Flat oriented game controllers position the majority of keys in a horizontal plane and position the forward keys in a vertical plane. To operate the forward keys to actuate electronic switches, separate, small, vertically oriented circuit switches are normally installed in the forward area of the controller in an orientation perpendicular to the printed circuit board. The vertical circuit boards contain elastomeric switches actuatable by the forward keys and for transmitting the generated signals to the larger, main printed circuit board and then to the video game console. The design, manufacture and mass production of the smaller vertically oriented circuit boards comprise a significant cost of game controller manufacture.

Such forward keys are normally similar in shape, size and touch, and are equally positioned relative to the displacement form the game controller centerline. During the frantic pace of game play, the forward keys are often confused because the touch is indistinguishable to the touch. Accordingly, incorrect key presses and the consequential on-screen action can result from such confusion.

Conventional game controllers have a key set known as a D-pad which comprises the key typically experiencing the heaviest utilization. Conventional D-pads comprise a single key having four compass point edges. When the D-pad is pressed by a gamer, an elastomeric key within an enclosure is depressed to close an electronic connection. This connection is transmitted to the console of the electronic gaming system so that a preprogrammed screen event is displayed. Such event can comprise a global icon movement in the direction of the press.

The travel range of D-pad keys is limited, and the elastomeric switches wear out during the intense cycles experienced during game controller play. D-pad keys can wear and separate from the clamshell housing during the middle of game play, resulting in game interruption and the consequential frustration. Additionally, conventional D-pad keys require relatively bulky skirt sections which increase key weight and reduce the responsiveness of the keys.

SUMMARY OF THE INVENTION

The present invention provides a game controller comprising a housing having an aperture through at least one portion of the housing, a printed circuit board within the housing, a switch proximate to the printed circuit board for selectively operating the printed circuit board, a key insertable through the housing aperture for engagment with the housing, wherein said key is moveable relative within a selected movement range relative to the housing, at least one plunger positioned between the key and the switch for translating movement of the key to the switch, and a pivot for limiting movement of the key toward the switch.

In other embodiments, the controller comprises a housing having an aperture through at least one portion of the housing, a printed circuit board within the housing, a switch proximate to the printed circuit board for selectively operating the printed circuit board, a pivot engaged with the housing, and a trigger rotatable about the pivot for engagement with the switch, wherein movement of the trigger causes the trigger to contact the switch.

DESCRIPTION OF THE PREFERRED EMBODIMENTS

Figure 1:
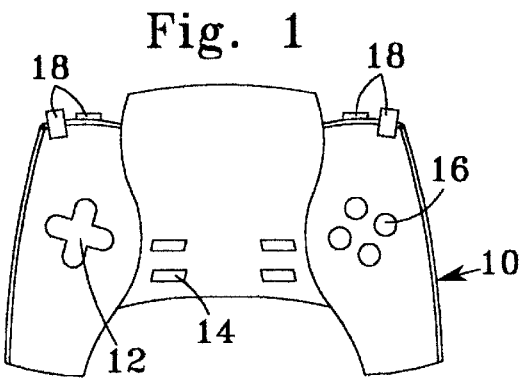
FIG. 1 illustrates a schematic for a game controller.

The invention relates to video game controller keys having superior action and reliability. FIG. 1 illustrates a top view of game controller 10 having D-pad 12, control keys 14, function keys 16, and front mount keys 18. D-pad 12 comprises the key experiencing the heaviest use during game play. As shown in FIG. 1, the exterior user interface of D-pad 12 is shaped in the form of a cross. Each extreme of the cross may be depressed to create directional movement in the desired game play direction. Control keys 14 are depressed by the player's right hand thumb and right index or middle fingers. Control keys 14 are assigned to specific actions in the game. Front mounted keys 18 are depressed by the left and right index or middle fingers and are assigned to specific game actions. Function keys 16 typically comprise low-use keys for controller and game setup and are not used during actual game play.

Figure 2:
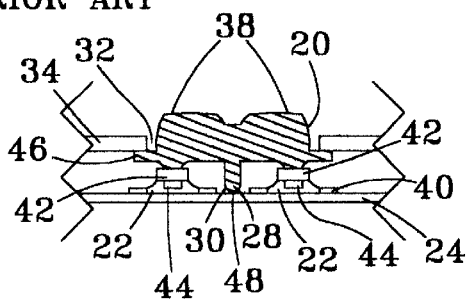
FIG. 2 illustrates a prior art D-pad key.

FIG. 2 illustrates a conventional, bottom-loaded D-pad 20 wherein four electronic switches 22 are positioned between D-pad 20 and housing printed circuit board 24 in the 12, 3, 6, and 9 o'clock positions. D-pad 20 includes pivot 28 integrated within D-pad 20 and having pivot end 30 in contact with printed circuit board 24. The lateral gap 32 between enclosure top clamshell or housing 34 and D-pad 36 is relatively large to permit characteristic "wobble" resulting from angular movement of D-pad about pivot 28. D-pad 20 has thumb surfaces 38 at the top. Bottom, right, and left surfaces. Conventional pivot 28 is integrated into D-pad 20 as illustrated, requiring extra mass and consequential response lag. Pivot 28 contacts printed circuit board 24 when one of thumb surfaces 38 is depressed, and elastomer membrane switch 40 having domes 42 is depressed. Upon such action, carbon pill 44 attached to the underside of dome 42 is contacted against a grid of exposed electrical tracks on printed circuit board 24. An electrical short results, causing a circuit actuation. Printed circuit board 24 comprises the backbone of the controller 10 electronics, and includes exposed grids of tracks forming electrical switches underneath elastomer membrane switch 40.

D-pad 20 includes large skirt 46 around a perimeter which is bottom loaded against housing 34. The relatively large skirt 46 must be sufficiently large to cover lateral gap 32 as D-pad 20 is moved relative to housing 34. Gap 48 between pivot 28 and printed circuit board 24 is required in the relaxed position to reduce rattling contact therebetween as D-pad 20 is pressed against housing 34 by elastomer membrane switch 40. Accordingly, pivot 28 is functional only after D-pad 20 is depressed by the player.

Figure 3:
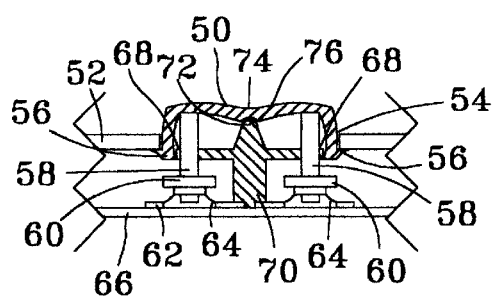
FIG. 3 illustrates a D-pad key having plungers for supporting the D-pad key above an elastomeric switch.

One significant limitation of conventional D-pads such as that illustrated in FIG. 2 is that the height of the components and the component travel is limited. The present invention eliminates this limitation by providing a unique combination of elements. FIG. 3 illustrates D-pad 50 integrated with housing 52 through a housing aperture. The clearance between D-pad 50 and housing 52 is identified as gap 54, which is substantially smaller than lateral gap 32 shown in FIG. 3. One or more clips 56 are attached to the lower portion of D-pad 50 for engagement with housing 52. Clips 56 or D-pad 50 are sufficiently flexible to permit the installation and engagement of clips 56 with upper clamshell of housing 50. Although clips 56 are illustrated as being integrated within D-pad 50, clips 56 could comprise separate components or could be integrated within housing 52 in other embodiments of the invention.

Plungers 58 are positioned in contact with D-pad 50, and have plunger bells 60 in contact with elastomer membrane switch 62 having domes 64. When D-pad 50 is depressed, a plunger 58 is moved downwardly so that the respective plunger bell 60 contacts a dome 64 for activation of switches on printed circuit board 66 as previously described. Movement of plunger 58 is constrained by plunger guides 68 attached to pivot post 70 so that movement of plungers 58 is substantially vertical. Pivot post 70 comprises a rounded top identified as pivot 72 for contact with pivot depression 74 formed in D-pad 50. Pivot depression 74 centers D-pad 50 relative to pivot 72 and provides for slight angular movement therebetween. Pivot post 70 is attached to printed circuit board 66 and provides a fixed distance between printed circuit board 66 and pivot 72.

Gap 76 is located between pivot 72 and D-pad 50 so that D-pad 50 floats on plungers 58 in the user ready position. When D-pad 50 is depressed on one or more sides, gap 76 is closed to limit downward movement of D-pad 50. The unique combination of components provides extraordinary flexibility in the design, orientation and location of D-pad 50. Although the height of prior art D-pads is limited above the printed circuit board, the present invention permits significant increases in the distance between D-pad 50 and printed circuit board 24. A smaller lateral clearance gap 54 can be smaller, providing more accurate movement and aesthetic appeal.

Figure 4:
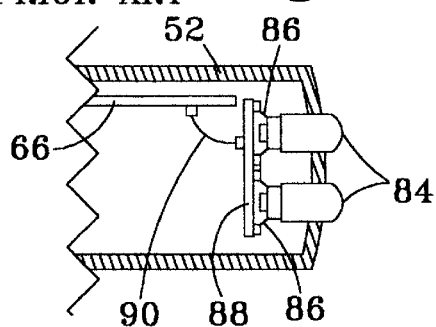
FIG. 4 illustrates an isometric view of the components.

FIG. 4 illustrates a three dimensional view of the invention showing plunger bell openings 78 which permit trapped air to escape therethrough. Additionally, plunger bell openings 78 permit the molding of each tooth 80 for facilitating a locking connection between plunger bell 60 against elastomer membrane switch 62. Each plunger bell tooth 80 can grip an exterior surface of dome 64 during installation to prevent plunger bell 60 from separating from elastomer membrane switch 62. Keying ring 82 can integrate with a tab on D-pad 50 to provide proper orientation during component assembly.

D-pad 50 is separated from elastomer membrane switch 40 as a selected distance because of the integral function provided by plungers 58. This feature of the invention permits curved, ergonomically shaped shell surfaces placed at odd heights with variable height or irregularly shaped keys. Virtually unlimited design flexibility in key shape is possible because the distance of D-pad 50 is liberated by plungers 58 from close proximity to printed circuit board 66. If an outer edge of D-pad 50 is depressed, plungers 58 travel downwardly to establish, consistent and uniform contact with the underlying switch circuits. Elastomer membrane switch 40 cannot be skewed to one side, significantly reducing elastomer wear by providing reliable contact with each operation of D-pad 50.

Another significant feature provided by the invention is the top-loaded assembly compared with bottom-loaded assembly typically used in game controllers. D-pad 50 cannot fall out during assembly or during rugged game play because clips 56 retain D-pad 50 in position, and preventing D-pad 50 from extending more than the selected distance from printed circuit board 66. By top-loading D-pad 50, the conventional skirt is eliminated. This reduction in mass provides quicker, more responsive operation. Additionally, D-pad 50 pivots on pivot 72 which provides smooth, responsive see-saw action as the grooved surface illustrated as pivot depression 74 cooperates with pivot 72. The pivot point provided by pivot 72 is significantly higher than conventional game controllers, and does not depend on the wobble motion required by other game controllers.

To assemble the components, D-pad 50 is clipped in from the top over the connecting links provided by plungers 58 after plunger bells 60 are friction fit onto the tops of domes 42. Plungers 58 then travel up and down with domes 42 as plunger tooth 80 assist with the friction fit of plungers 58 against domes 42. The assembly is turned over and the assembly formed by elastomer membrane switch 40 and plungers 58 are fitted by inserting plungers 58 through plunger guides 68. This configuration eliminates rattles as plungers 58 are squeezed slightly between elastomer membrane switch 40 and D-pad 50.

By using two or more plungers 58 having different lengths, or by altering the level of the lower part of D-pad 50 or of printed circuit board 66, D-pad 50 can be placed at many different angles and is not constrained in a parallel position relative to printed circuit board 66. Although the orientation of plungers 58 relative to D-pad 50 have been illustrated, the same concept can be implemented for control keys, triggers, and other key devices. Pivot 72 is illustrated a separate from D-pad 50, however pivot 72 could be inverted and attached to D-pad 50 in other embodiments of the invention. Plungers 58 can comprise separate components or can be integrated within D-pad 50.

Figure 5:
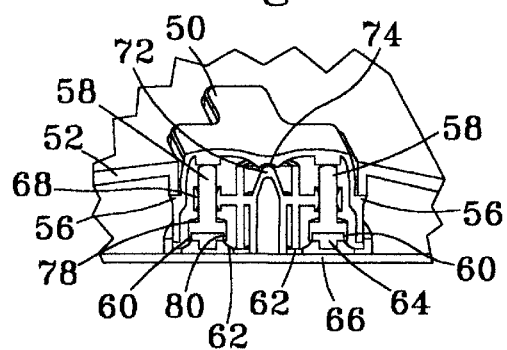
FIG. 5 illustrates prior art front keys combined with a separate vertical printed circuit board.

FIG. 5 illustrates a representative example of prior art forward keys 84 which are operable with an index or middle finger to actuate elastomeric switches 86 mounted on vertical printed circuit boards 88. Forward keys can be attached to housing 52 with screws, clips, or a subassembly to housing 52. Cable connection 90 can connect vertical printed circuit boards 88 to main printed circuit board 66, requiring additional expense and providing failure paths.

Figure 6:
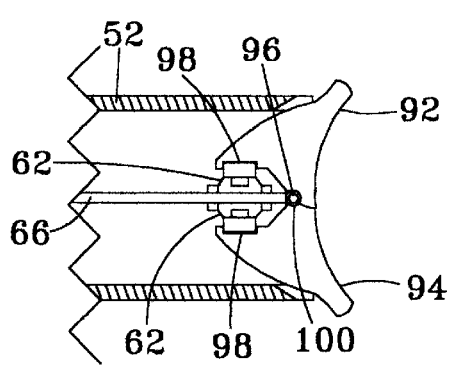
FIG. 6 illustrates two triggers for operation with a main printed circuit board.
Figure 7:
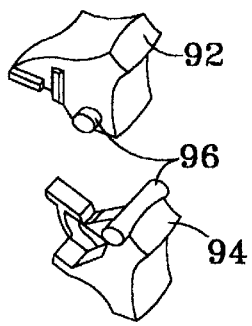
FIG. 7 illustrates isometric views of left and right trigger components.

FIG. 6 illustrates one embodiment of the invention wherein triggers 92 and 94 perform the operating function provided by forward keys 84. Triggers 92 and 94 can be pulled backwardly from the initial position and pivot about axle 96 retained within the game controller housing 52. As shown in detail in FIG. 7, each trigger 92 and 94 has a trigger radius from axle 96 which maintains a constant clearance from housing 52 during operation of triggers 92 and 94. Axle 96 is positioned within cylinders 100 integrated into triggers 92 and 94. Hammer 98 is attached to each trigger 92 and 94 to contact elastomeric membrane switches 40 and to close circuits on printed circuit board 66.

This feature of the invention eliminates the vertical printed circuit board found in conventional game controllers, and significantly reduces manufacturing cost. Additionally, the invention eliminates the wire connections between vertical and main printed circuit boards which are subject to failure.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A game controller comprising:
   a housing having an aperture through at least one portion of said housing;
   a printed circuit board within said housing;
   a switch proximate to said printed circuit board for selectively operating said printed circuit board;
   a key insertable through said housing aperture for engagement with said housing, wherein said key is moveable relative within a selected movement range relative to said housing;
   at least one plunger positioned between said key and said switch for translating movement of said key to said switch;
   a plunger guide for controlling movement of said plunger; and
   a pivot for limiting movement of said key toward said switch.

2. A game controller comprising:
   a housing having an aperture through at least one portion of said housing;
   a printed circuit board within said housing;
   a switch proximate to said printed circuit board for selectively operating said printed circuit board;
   a key insertable through said housing aperture for engagement with said housing, wherein said key is moveable relative within a selected movement range relative to said housing;
   at least one plunger positioned between said key and said switch for translating movement of said key to said switch;
   a pivot for limiting movement of said key toward said switch; and
   a depression in said key for contacting said pivot.

3. A game controller comprising:
   a housing having an aperture through at least one portion of said housing;
   a printed circuit board within said housing;
   a switch proximate to said printed circuit board for selectively operating said printed circuit board;
   a key insertable through said housing aperture for engagement with said housing, wherein said key is moveable relative within a selected movement range relative to said housing;
   clips attached to said key for selectively retaining said key in engagement with said housing;
   at least one plunger positioned between said key and said switch for translating movement of said key to said switch; and
   a pivot for limiting movement of said key toward said switch.

* * * * *